Jan. 17, 1967    M. M. SEELOFF ET AL    3,298,587

LAP SEAM WELDING MACHINE

Filed May 14, 1963    2 Sheets-Sheet 1

INVENTORS
MELVIN M. SEELOFF
ROY W. PEARSON
BY Francis J. Klempay
ATTORNEY

Jan. 17, 1967   M. M. SEELOFF ET AL   3,298,587
LAP SEAM WELDING MACHINE
Filed May 14, 1963                   2 Sheets-Sheet 2

INVENTORS
MELVIN M. SEELOFF
ROY W. PEARSON
BY Francis J. Klempay
ATTORNEY

United States Patent Office 3,298,587
Patented Jan. 17, 1967

3,298,587
LAP SEAM WELDING MACHINE
Melvin M. Seeloff and Roy W. Pearson, Warren, Ohio, assignors to The Taylor-Winfield Corporation, Warren, Ohio, a corporation of Ohio
Filed May 14, 1963, Ser. No. 280,209
16 Claims. (Cl. 228—5)

This invention relates to the art of joining metal strip in general end-to-end relation and while having special application to the joining of strip made of the softer metals, such as aluminum, it may also be used for steel strip in the thinner gauges. For various reasons the most practical method of joining strip is by electric resistance seam welding of overlapped portions and when dealing with the softer metals and thin gauges, particularly, it is necessary to provide a substantial overlap well outwardly beyond the weld line if consistently good results are to be obtained. However, in many strip processing and utilization lines receiving the joined continuous strip the overlap is objectionable and it is accordingly desirable to reduce the thickness of the overlapped joints substantially down to the thickness of the parent strip. This cannot be done in a practical manner if the overlap is extensive.

The primary object of the present invention is to provide an operative and practical method whereby seam welds in widely overlapped soft and/or thin strip may be readily reduced in thickness substantially down to the thickness of the parent strip and wherein the weld is of consistently good quality throughout the width of the strip lengths which are joined. This is accomplished, in accordance with this invention by shearing off the excess overlap on both surfaces of the joined strip immediately after the seam welding sequence to thereby reduce the extent of the initial overlap down substantially to the width of the weld zone. The resulting small fused overlap may then be readily reduced in thickness by rolling or peening. The final joint appears then as a fairly narrow line across the joined strip and is of a thickness substantially equal to the thickness of the original or parent strip.

A further object of the invention is the provision of combined apparatus which is operative to carry out the above recited method in a rapid and expeditious manner thus suitable for use in high speed strip processing and/or utilization lines. The apparatus consists of a precision type of travelling head seam welder and a specially designed shearing assembly which is carried along with the head, closely following the seam welding wheels during traverse of the head across the strip to be joined. Preferably, the head also carries suitable means such as a rapidly reciprocating peening hammer assembly which closely follows the shearing device to reduce the thickness of the narrow welded overlap during the working traverse of the head. In this manner all the essential steps of the process, except the initial end preparation of the strip, is accomplished in one pass across the overlapped strip whereby the final joint is completed in a minimum length of time.

The above and other objects and advantages of the invention will become apparent upon consideration of the following specification and accompanying drawing wherein there is disclosed a preferred embodiment of the invention.

Figure 1:
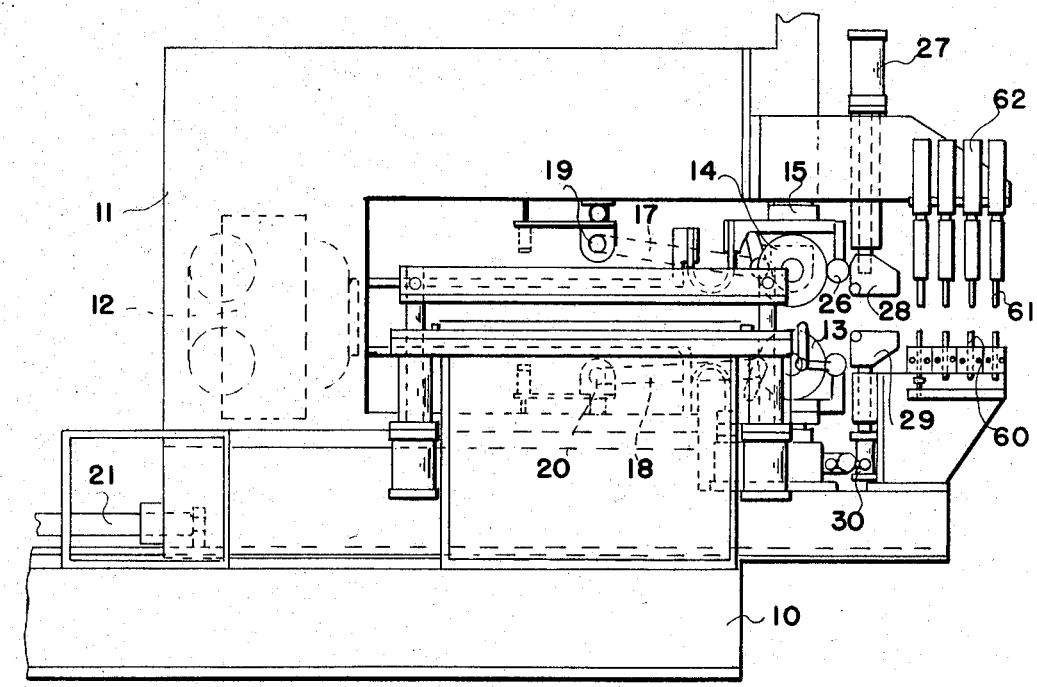
FIGURE 1 is a partial side elevation of combined apparatus devised for the purpose of carrying out the method of our invention.

The basic part of the apparatus comprises a more or less known type of travelling head seam welder having a base 10 on which is slideably mounted a C-shaped travelling head or carrier 11. This latter structure mounts a welding transformer 12, a lower vertically adjustable welding wheel 13, and an upper welding wheel 14 which is carried on a vertical slide 15 for up and down movement by a cylinder 16. In accordance with usual practice, the latter cylinder also provides the welding pressure required between the electrode wheels in making the seam weld. The wheels 13 and 14 are preferably lightly driven through chains or belts 17 and 18 by slip drives 19 and 20, respectively, in the manner and for the reasons disclosed in copending application Serial No. 173,175, now Patent No. 3,158,075, which is owned by the assignee of the present application. This drive is useful in preventing puckering or tearing when welding very thin, soft strip.

The carrier 11 is, in accordance with usual practice, arranged to be slideably moved on the base 10 by a screw 21 driven by a motor-reducer, not shown, also mounted on the base 10. The base 10 also mounts an entering strip clamp 22 and an exit strip clamp 23 mounted on a slide 24 for slight movement longitudinally of the path of travel of the strip through the apparatus. This slide 24 is arranged to be actuated in opposite directions by double-acting cylinders 25 of which only one is shown. In actual practice suitable adjustable stops, also not shown, are provided to limit the inward and outward movement of the slide 24 and clamp 23 so that a precise spacing between the clamps 22 and 23 may be provided for a purpose to be later described.

Figure 11:
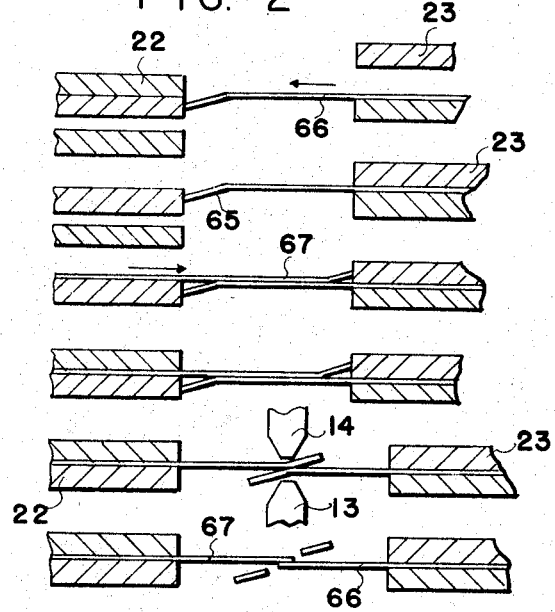
FIGURE 11 is a sequence of views illustrating the manner in which the strip lengths are loaded into the strip clamps, the weld performed, and the excess overlap removed.

Reference numeral 26 designates motor driven abrasive wheels or wire brushes which are held lightly against the welding wheels to keep the peripheries thereof in clean condition. It will be understood that the overlapped strip lengths to be welded together are tightly held in the clamps 22 and 23 as indicated in the sequence of FIGURE 11 prior to the start of the welding traverse of the head or carrier 11. Mounted for vertical movement by cylinder 27 on the upper leg of the carrier 11 is an upper shearing device 28 while a lower shearing device 29 is mounted for vertical movement on the lower leg of carrier 11 and arranged to be actuated by a cylinder 30. These shearing devices which are shown in detail in FIGURES 4 through 10 will now be described.

Figures 3, 4, 5, 10:
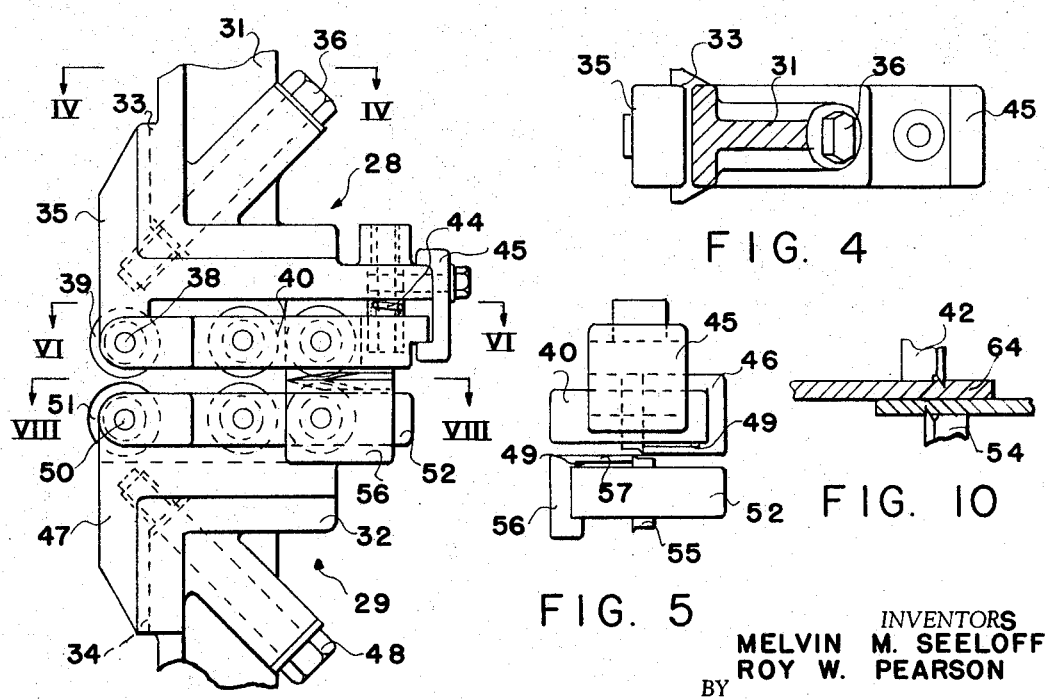
FIGURE 3 is a fragmentary side elevation of a specially constructed shearing device utilized in our invention.
FIGURE 4 is a sectional view taken along the line IV—IV of FIGURE 3.
FIGURE 5 is a fragmentary end elevation of the apparatus of FIGURE 3.
FIGURES 9 and 10 are fragmentary views of details of the apparatus of FIGURE 3.
Figure 2:
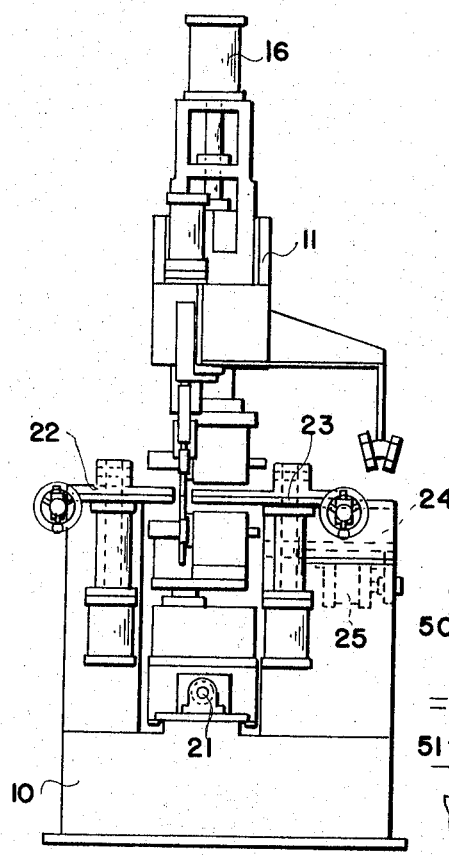
FIGURE 2 is an end elevation of the apparatus of FIGURE 1.
Figure 6:
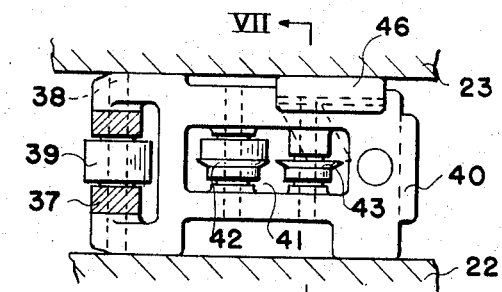
FIGURE 6 is a section taken along the line VI—VI of FIGURE 3.

The shearing devices 28 and 29 are, in practice, carried by precisely guided upper and lower slides 31 and 32, respectively, which in turn are actuated by the cylinders 27 and 30, respectively. The lower end of slide 31 is formed with a locating groove 33 while the upper end of the lower slide 32 is formed with a similar locating groove 34. Partially received in groove 33 is an L-shaped member 35 which is rigidly but detachably clamped to the slide 31 by a bolt 36 as shown in FIGURES 3 and 4. Member 35 has a pair of lugs 37 which extends downwardly from the outer corner of the member for mounting a pivot pin 38. Pin 38 journals a gauging roller 39 intermediate the lugs 37 and also pivotally mounts a carrier 40 which, as shown in FIGURE 3, extends generally horizontal and below and parallel with the horizontal portion of the L-shaped member 35. Carrier 40 has a centrally disposed vertical opening 41 in which is journaled a first annular knife 42 and a second annular knife 43. The cutting edges of these knives are formed by beveling flanges on small steel rollers, and it should be noted particularly that the cutting edge on the knife 43 is on the outside edge of this flange. The purpose of this will be explained later but in the meantime it will be well to remember that the knife 42 is for the purpose of only partially severing (scoring) the stock while the final cutoff is made by the knife 43.

The end of the carrier 40 opposite the pin 38 is free to swing vertically against the force of a compression spring 44 while a keeper 45 limits the downward movement of this end of carrier 40. The purpose of this arrangement is to provide a safety release in the event of malfunctioning of the knives or upon the shearing assembly meeting an unusual obstruction during its traverse across the strip. Carrier 40 is of a width to slideably fit precisely within the jaws of clamps 23 and 22 when the clamp 23 is shuttled to its outermost position against the adjustable stops previously described.

Figure 7:
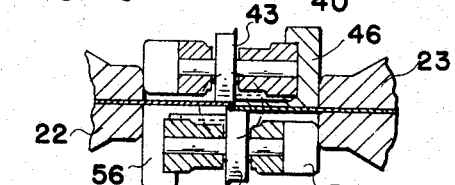
FIGURE 7 is a sectional view taken along the line VII—VII of FIGURE 6.
Figure 8:
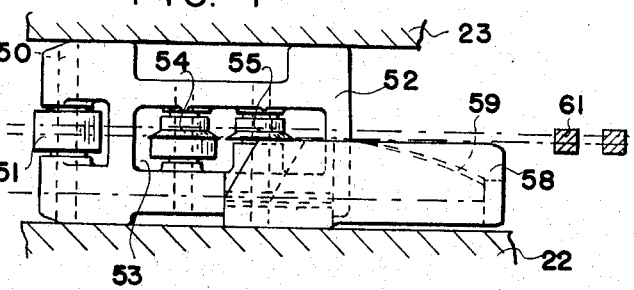
FIGURE 8 is a section taken along the line VIII—VIII of FIGURE 3 but showing an additional feature which may be incorporated in the assembly of FIGURE 3.

Rigidly mounted on the carrier 40 is a wedge member 46 which is C-shaped in end elevation as shown in FIGURES 5 and 7 and which has its wedge portion underlying the carrier 40 and extending into wiping engagement with the face of the rotary knife 43. This wedge portion of member 46 is quite thin and has its wedging edge facing in the direction of travel of the shearing assembly. As viewed in plan the thin edge of the wedge member 46 is angled to the rear of the direction of travel as it approaches the rotary knife 43. The purpose of the thin edge on member 46 is to enter in between the overlap of the top strip outwardly of the line of weld to lift the excess overlap into positive cutting relation to the rotary knife 43 whereby this excess strip overlap is completely severed from the weld. It should be noted that the top surface of the lower horizontal portion of member 46 is recessed as shown at 49 to provide a tunnel for the passage of the severed strip.

Partially received within the locating groove 34 of the lower slide 32 is a second L-shaped carrier 47 which is rigidly but detachably clamped by the bolt 48. Carrier 47 mounts a pin 50 journaling a gauging roller 51. Carrier 47 is also of such width as to slideably fit within the strip clamps 22 and 23 and has a vertical opening 53 in which are journaled two annular knives 54 and 55. The knives 54 and 55 are identical to the knives 42 and 43 previously described, and by referring to FIGURE 7 particularly it will be noted that the final shearing knives 43 and 55 are reversed with respect to each other and overlap just sufficiently to give the wanted final overlap in the weld zone of the joined strip. Similarly the rotary scoring knives 42 and 54 are journaled in their carriers 40 and 47 in vertically aligned but reversed offset relation as shown in FIGURE 10. It should be observed that the forces exerted on the joined strip by the upper rotary knives 42 and 43 are resisted in equal measure by the forces exerted on the strip by the lower rotary knives 54 and 55. This is accomplished by making the hubs of the scoring and shearing rolls the same diameter as the gauging rolls 39 and 51. Thus these hubs will ride directly on the strip and immediately over the points where the scoring and shearing is taking place. This backing up of the strip by the wheel hubs, directly over the scoring and shearing points, also prevents a twisting or cocking action of the strip, at the weld, due to the offset condition of the scoring and shearing wheels. This backing up action is especially important on thin gauge material. The differential between the wheel hub diameter and the cutting edge diameter determines the depth of the scoring.

Rigidly attached to the lower carrier 47 is a C-shaped wedge member 56 which is similar in all respect to the wedge member 46, having a wedge portion 57 (FIGURE 5) which overlies the top surface of carrier 47 and which extends into wiping contact with the face of the lower severing roll 55. It should be understood that the thin wedge portions of members 46 and 56 are spaced sufficiently from their carriers 40 and 47 that the strips of sheet metal can slide out of the assembly through the tunnels 49 after they have been sheared off by the action of the wedge members and the cutting wheels 43 and 55. To divert these strips of scrap sheet metal away from the line of weld the wedge portions of the members 46 and 56 are extended rearwardly as shown at 58 in FIGURE 8 and these extensions are provided with compound curved surfaces 59 which operate like plow blades to curve the scrap strips into vertical position spaced well outwardly of the weld zone. This brings the weld line or zone out into the open thereby permitting engagement by apparatus used to reduce the thickness of the overlapped weld.

Figure 9:
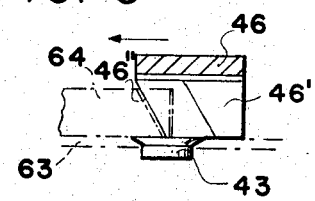

Referring again to FIGURE 1 it will be noted that a series of anvils 60 are carried by the extreme end of the lower arm of the carrier 11 rearwardly of the slitting assembly 29 as related to the direction of working travel of the carrier 11. Opposing these anvils 60 are peening hammers 61 which are reciprocated by air motors 62 which are carried by the upper arm of the carrier 11. While the drawings illustrate the plow-like diverter 58 as being mounted only on the lower shear carrier 52 it will be understood that a similar diverter will also be provided for the upper shear assembly 28. These diverters are operative to move the upper scrap strip to one side of the hammer 61 while the lower scrap is diverted to the other side of the anvil 60. These anvils and hammers are aligned in relation the weld line or zone effected by the weld wheels 13 and 14 and during working traverse of the carrier 11 are operative to peen down the overlapped and trimmed weld substantially to the thickness of the parent strip as above explained. FIGURE 9 illustrates the coaction of the wedge member 46 and the shear wheel 43. In this view the direction of travel of the device is as shown by the arrow, and the reference numeral 63 designates the wanted extent of the overlapped weld. Member 46 carries the wedge 46' which is sharpened down to the slanted edge 46". Reference numeral 64 designates the surplus strip which is to be removed, and it should be understood that the edge 46" slices under this surplus strip and in the process raises it forcibly against the annular cutting edge of the severing wheel 43.

It should also be obvious that in both the upper and lower shearing assemblies the cutting edges of the scoring and severing rolls lie in the same plane so that only a portion of the thickness of the parent strip need be cut through by the severing rolls 43 and 55. This reduces the strength requirement of the severing rolls, their journaling pins, and the wedges 46' and 57 allowing the latter to be made quite thin which in itself facilitates the operation of the apparatus. FIGURE 10 illustrates the action of the rotary scoring knives.

Referring now to FIGURE 11 which illustrates in descending order a sequence of operations in the practice of our invention, it will be noted that we first prepare the ends of the strip lengths to be joined by bending an end portion out of the general plane of the strip as shown at 65. The tail end of the leading strip length (66) is bent downwardly while the head end of the next succeeding or trailing strip length (67) is bent upwardly. The purpose of this is to facilitate the precise loading of the end portions of the strip lengths to be joined in the strip clamps so that upon separation of the clamps through a precisely controlled distance a limited flat overlap will be obtained to provide a wanted width of weld while the end extremities of the strip lengths flare away from the general plane of the joined strip to facilitate the action of the wedges 46' and 57. Further, the arrangement minimizes scrap loss in that the widths of the scrap strips are carefully controlled and of a dimension only sufficient to allow for sound seam welding and for operation of the shearing assemblies.

At the start of a cycle of operation as depicted at the top of FIGURE 11, the entry clamp 22 is closed while the exit clamp 23 is open and the tail end of the leading strip length 66 with its bent-down portion is moved backwardly either manually or by suitable equipment, not shown, until this trailing end engages the platens on the entry clamp 22. As next shown, the exit clamp 23 is now closed, the entry clamp opened, and the head end of the new strip length 67 is advanced into the machine until the bent-up leading end engages the upper platen of the exit clamp. Thereafter the entry clamp is closed and the exit clamp is retracted a predetermined distance by the cylinders 25. It should be understood, that wherever mentioned, if the end bending operation is not done automatically the front corner of the strip can be manually bent by the operator after the strips have been positioned against the closed clamps. By this time in the normal sequence of operations of the machine the welding wheel 14 will have been lowered to proper welding position and the shear assemblies 28 and 29 move toward each other and thus to proper operating positions. The lower shear assembly 29 moves upward against a precisely controlled stop which positions the top of the gauging roll 51 relative to the bottom of the clamped strip. The upper shear assembly is lowered onto the top strip thus firmly squeezing the two strips between the gauging rolls 39 and 51. The upper shear assembly can thus float up and down when variations in strip thickness are encountered. If desired, precise stops can be furnished to precisely position both the upper and lower shear assemblies 28 and 29 so that the space between the gauging rolls 39 and 51 will be equal to double the thickness of the parent strip lengths with this space lying in the plane of the overlapped weld. Therefore, immediately upon the exit clamp 23 reaching its stops the driving screw 21 may be actuated to being the joining traverse. As the welding wheels 13 and 14 reach the work, the welding transformer 25, whose secondary terminals are suitably connected to the wheels, is energized by automatic control, well known in the art but not a part of the present invention, and the wheels will be assisted in climbing up onto the work by the slip drives 17–20. Seam welding commences and shortly thereafter the shearing assemblies 28 and 29 reach the work with the gauging rolls 39 and 51 first contacting the work. It should be noted that the front corners of the carriers 40 and 52 are rounded or angled to facilitate the entry of these carriers in between the opposing faces of the platens of the strip clamps whereby the shearing assemblies will be precisely guided across the welded strip and in uniform longitudinal relation to the weld. Rolls 39 and 51 insure that the overlapped and welded strip will be brought into precise relation vertically with respect to the scoring knives 42 and 54 and the severing assemblies which follow. This makes it possible for the scoring knives to penetrate only a predetermined uniform portion of the thitckness of the welded strip lengths. In practice, the knives 42 and 54 may cut through only half the thickness of the strip, leaving the remaining thicknesses to be severed by the annular knives 43 and 55. As explained above, the latter ride directly in the score lines made by the knives 42 and 54.

The above described vertical registering of the overlapped welded strip with respect to the units 28 and 29 insures that the wedge member 46 of the upper unit will enter the flat V-shaped space between the top surface of strip length 66 and the upturned end portion of the strip length 67 while the wedge member 57 will enter the space below the bottom surface of the strip length 67 and the downturned end portion of strip length 66. This insures that the surplus and unwanted portions of the original overlap will always be brought into severing relation with the cutting wheels 43 and 55.

By means of automatic sequencing control, not shown, the peening hammers 61 are closed to operative positions and energized as the strip is reached during working traverse of the carrier 11 so that the welded and trimmed overlap will be automatically reduced to proper thickness during continuation and completion of this traverse. Upon such completion the clamps 22 and 23 may be immediately re-opened and the welded strip restarted along its path of travel through the machine. During such running of strip the wheel 14 as well as the units 28 and 29 and the peening attachment are retracted from the plane of the strip thus enabling the carrier 11 to be slid back to its initial starting position as shown in FIGURE 1 in preparation for the next cycle of operation which is signaled by the approaching end of the running strip. The running strip is then stopped and its tail end, after being square sheared, is either automatically bent down the full width of the strip or has a corner manually bent down as explained above. This end is then moved into the machine and backed up to begin the sequence of operation suggested by FIGURE 11 and described above.

The above described method of attaching the L-shaped carriers 35 and 47 to the slides 31 and 32 is highly advantageous in that the whole assembly of the shearing units may be very quickly removed and replaced simply by removing and replacing the bolts 36 and 48. In actual practice a substantial number of the subassemblies carried by the members 35 and 47 may be kept on hand for use on stock of different gauge or hardness and for sharpening the cutting wheels and lifting blades as will be understood.

It should now be apparent that we have provided an improved method and apparatus for joining strip having particular utility in the joining of thin, soft strip, of aluminum for example, which has heretofore presented substantial problems. By the use of our invention it is possible to utilize the advantageous seam welding technique which requires a wide overlap while yet providing a final joint which is very narrowly overlapped and reduced to the thickness of the parent strip. Further, all of this may be accomplished by the use of our method and apparatus in a time interval no greater than that required for a simple seam welding operation.

Having thus described our invention what we claim is:

1. In apparatus for seam welding overlapped strip having a pair of spaced strip clamps and a sliding carriage mounting a pair of welding wheels movable between said clamps, the improvement comprising a pair of supports mounted on said carriage adjacent to and in following relation with said wheels during a welding traverse, a roller mounted on each of said supports at the forward end thereof for engaging opposite surfaces of the welded seam of the workpiece, and means mounted on said supports in predetermined positional relation to said rollers for trimming off excess strip material contained in the overlap of the strip and extending beyond the weld line, said roller mounted on each of said supports being operative to insure that the welded strip will be brought into precise vertical position with said trimming edge.

2. Apparatus according to claim 1 further characterized in that said supports are so dimensioned in width as to have sliding and guiding contact with the facing inner edges of the clamps.

3. Apparatus according to claim 1 further including means carried by said supports for diverting the strips sheared off the workpiece by said trimming means away from the line of weld, and means mounted on said carriage rearwardly of said supports for reducing the thickness of the overlapped weld down to substantially the thickness of the parent strip.

4. Apparatus according to claim 1 further characterized in that said trimming means comprises a pair of opposed rollers each having an annular knife edge for scoring the opposite surfaces of the workpiece on opposite sides of the weld line, and said trimming means further comprising means carried by said supports rearwardly of said scoring rollers for serving the excess strip outwardly of the score lines from said workpiece.

5. Apparatus according to claim 4 further characterized in that the means for serving comprises a second pair of opposed rollers each having a knife-edged flange at one of its axial ends, and said means for serving further including wedges carried by said supports to separate the excess strips from the workpiece and to force the same into cutting relation with the knife-like edges of said flanges, said second pair of opposed rollers being so positionally related to the scoring rollers that said flanges track in the scoring lines made by the scoring rollers.

6. Apparatus according to claim 5 further including means carried by said supports rearwardly of said wedges for diverting the sheared off strip scrap away from the line of weld, and further including means mounted on said carriage rearwardly of said supports for reducing the thickness of the overlapped weld down to substantially the thickness of the parent strip.

7. Apparatus according to claim 4 further characterized in that the annular knife edges are formed by tapered flanges on the rollers, the tapers being on the side of the flanges inwardly of the cutting edges thereof to thereby impart slight bevels to side edge portions of the overlapped weld.

8. Apparatus according to claim 5 further characterized in that the bevels on the flanges of said severing rollers are on the sides of said flanges facing the center line of weld whereby the strips being sheared off can be displaced away from the plane of the workpiece as the shearing takes place.

9. Apparatus according to claim 1 further characterized in that one of said strip clamps is mounted for sliding movement toward and away from the other clamp through a precise distance, the arrangement being such that upon loading the strip lengths into the apparatus the inner face of one of said clamps may be used to gauge the position of the trailing end of a forward strip length while the inner face of the other clamp may be used to gauge the position of the leading end of a trailing strip length after which both clamps are closed and moved apart to space said ends from the adjacent faces of said clamps to permit passage of said severing means.

10. In a traveling head seam welder having opposed weld wheels for engaging opposite sides of overlapped strip portions to seam weld the same together, the combination of means mounted for movement along with said head in trailing relation to said wheels for trimming off excess portions of the overlap of said strip outwardly of the line of weld, means mounted for movement along with said weld wheels and trimming means and in trailing relation to the latter for reducing the thickness of the overlapped weld, said trimming means comprising supports adapted to overlie the opposite surfaces of the workpiece, each of said supports having a flat roller for riding on the overlapped and welded strip and also an annular shearing knife for shearing off the excess portion of the strip outwardly of the weld zone.

11. Apparatus according to claim 10 further including a wedge carried by each of said supports in abutting relation with the annular shearing knife carried thereby, said wedges being operative to lift said excess portions of strip away from the plane of the parent strip and into forceable engagement with the cutting edge of said annular knife.

12. Apparatus for severing free end portions of overlapped strip lengths after seam welding of the same along a line intermediate of the ends of the lengths comprising a pair of supports adapted to overlie opposite surfaces of the overlap, means rigidly interconnecting said supports for moving the same relative to the overlap along said line of weld, each of said supports mounting an annular shearing knife and a wedge outwardly of said annular knife with respect to the line of weld to lift the stock to be trimmed off away from the plane of the parent strip and to force the same into engagement with the cutting edge of said annular knife.

13. Apparatus according to claim 12 further including mounting means for the knife on one of said supports, said mounting means being yieldably carried by the said one of said supports for permitting retraction of the annular knife away from the plane of the overlap in the event of malfunctioning of the apparatus.

14. Apparatus for severing free end portions of overlapped strip lengths after seam welding of the same along a line intermediate of the ends of the lengths comprising a pair of supports adapted to overlie opposite surfaces of the overlap, means rigidly interconnecting said supports for moving the same relative to the overlap along said line of weld, each of said supports mounting an annular knife having a cutting edge and a cylindrical hub of less diameter than the diameter of the cutting edge extending outwardly of one side of the cutting edge, said knives being positioned opposite to each other but reversed with respect to each other whereby the hub portions have rolling contact with the overlapped and welded strip to force the strip into cutting relation with the respective cutting edges of the annular knives, said knives being operative to score said free end portions of the overlapped and welded strip lengths, and means carried by said supports in trailing relation to said knives for severing said free end portions along the score lines.

15. Apparatus according to claim 14 further characterized in that said severing means comprises a second pair of annular knives carried by the supports and so positioned thereon that the cutting edges of the second pair of knives follow in the score lines, a wedge member carried by each support having a flat portion extending to the cutting edge of the severing knife carried by the support and operative to enter in between the overlapped strip and to raise said end portions of the overlapped strip into cutting relation with said severing knife, and the surfaces of said wedges which slideably engage the end portions being severed being spaced from said supports to permit passage of the severed end portions.

16. Apparatus according to claim 12 further characterized in that each of said edges comprises a flat member overlying a surface of its port, said flat member being recessed to provide with said surface a tunnel for the outward passage of the severed end portion of the overlapped strip lengths.

References Cited by the Examiner

UNITED STATES PATENTS

| | | | |
|---|---|---|---|
| 2,143,969 | 1/1939 | Biggert | 29—33.21 |
| 2,197,962 | 4/1940 | Anderson | 228—19 |
| 2,794,244 | 6/1957 | Vecjer | 29—481 |
| 2,854,743 | 10/1958 | Gollwitzer | 29—481 |
| 2,892,921 | 6/1959 | Mecklenborg | 219—105 |
| 3,132,544 | 5/1964 | Jones | 29—481 |
| 3,162,161 | 12/1964 | Verbeek | 228—19 |
| 3,225,999 | 12/1965 | Heller et al. | 228—4 |

FOREIGN PATENTS

| | | |
|---|---|---|
| 350,246 | 6/1931 | Great Britain. |

JOHN F. CAMPBELL, *Primary Examiner.*

M. L. FAIGUS, *Assistant Examiner.*